United States Patent
Khim et al.

(10) Patent No.: US 11,705,762 B2
(45) Date of Patent: Jul. 18, 2023

(54) METHOD FOR GAME CONSOLE OPERATION BASED ON DETECTION OF CHANGE IN CONTROLLER STATE

(71) Applicant: Sony Interactive Entertainment LLC, San Mateo, CA (US)

(72) Inventors: Jeansoo Khim, San Jose, CA (US); Steven Osman, San Francisco, CA (US)

(73) Assignee: Sony Interactive Entertainment LLC, San Mateo, CA (US)

( * ) Notice: Subject to any disclaimer, the term of this patent is extended or adjusted under 35 U.S.C. 154(b) by 343 days.

(21) Appl. No.: 16/912,515

(22) Filed: Jun. 25, 2020

(65) Prior Publication Data

US 2021/0408839 A1 Dec. 30, 2021

(51) Int. Cl.
*A63F 13/428* (2014.01)
*A63F 13/40* (2014.01)
*H02J 50/80* (2016.01)
*H02J 50/90* (2016.01)

(52) U.S. Cl.
CPC ............ *H02J 50/80* (2016.02); *A63F 13/40* (2014.09); *A63F 13/428* (2014.09); *H02J 50/90* (2016.02)

(58) Field of Classification Search
None
See application file for complete search history.

(56) References Cited

U.S. PATENT DOCUMENTS

| | | |
|---|---|---|
| 2014/0361976 A1 | 12/2014 | Osman et al. |
| 2015/0015486 A1 | 1/2015 | Osman et al. |
| 2015/0089248 A1 | 3/2015 | Obie et al. |
| 2015/0130623 A1* | 5/2015 | Robison ............... G06F 9/542 340/636.1 |
| 2017/0144062 A1 | 5/2017 | Iwao et al. |

(Continued)

FOREIGN PATENT DOCUMENTS

| | | |
|---|---|---|
| CN | 102792511 A | 11/2012 |
| CN | 208174317 U | 11/2018 |
| CN | 111211621 A | 5/2020 |

OTHER PUBLICATIONS

International Search Report & Written Opinion dated Nov. 5, 2021 for International Patent Application No. PCT/ US2021/036220.

(Continued)

*Primary Examiner* — Peter J Iannuzzi
(74) *Attorney, Agent, or Firm* — JDI Patent; Joshua D. Isenberg; Robert Pullman (57) ABSTRACT

A method, system and device for controller operation, comprises detecting a change in a state of the controller from a charging state to an operation state. A state of the computing device changes from a controller charging state to a controller operation state in response to detecting the change in the state of the controller. The computing device receives an input from the controller sends a visual indication of the input to a display device. Additionally, a method, system and device for enhanced controller charging, may comprise detecting a change in a controller state from an operation state to a charging state. A computing device determines whether an ignore input is present after detecting the change in controller state and automatically signs out of a user account or automatically goes into a standby mode when the ignore input is not present.

12 Claims, 9 Drawing Sheets

(56) References Cited

U.S. PATENT DOCUMENTS

| | | | |
|---|---|---|---|
| 2017/0262035 A1 | 9/2017 | Agarwal et al. | |
| 2018/0001205 A1 | 1/2018 | Osman et al. | |
| 2018/0071634 A1* | 3/2018 | Carvallo | A63F 13/25 |
| 2018/0359246 A1* | 12/2018 | Dannemiller | A63F 13/23 |
| 2019/0369842 A1* | 12/2019 | Dolbakian | G06F 3/04886 |
| 2021/0402301 A1* | 12/2021 | Sherwani | A63F 13/5378 |

OTHER PUBLICATIONS

Taiwanese Search Report Application No. 110119388, dated Apr. 6, 2022.

* cited by examiner

METHOD FOR GAME CONSOLE OPERATION BASED ON DETECTION OF CHANGE IN CONTROLLER STATE

FIELD OF THE DISCLOSURE

The present disclosure relates to the field of controllers. Specifically, aspects of the present disclosure relate to charging game controllers.

BACKGROUND OF THE INVENTION

Game controllers have been used to control a variety of computing devices from computers to game consoles. Typically, game controllers connect to computing devices via a wire connection. More recently game controllers have moved to wireless connections to the computing device.

Wireless game controllers require a power source other than power from the computing device itself. Wireless game controllers are typically battery powered. Battery powered game controllers can either use disposable, primary cell batteries such as alkaline batteries, NiOx batteries, Zinc-carbon batteries, etc. or rechargeable, secondary cell batteries such as Nickel-Cadmium, lithium ion, Nickel-metal hydride, rechargeable alkaline etc.

Primary cell batteries have fallen out of favor, as they are wasteful and inconvenient. Primary cells are wasteful because they cannot be reused after they run out of electricity and must be thrown away. Primary cells are inconvenient for the user because after they run out of electricity the user must replace them with another battery that fits the game controller. There are many battery size standards and the user must know what size battery fits their controller. This creates problems for the user after they purchase a game controller because they will eventually have to buy or otherwise obtain batteries that fit the controller and they must remember the correct size of battery for the controller. Thus, rechargeable batteries represent a more favorable option for wireless device manufacturers because they are more convenient for the user.

Secondary cell batteries provide enhanced convenience for the user but also have their own problems. One advantage of secondary cell batteries is that they may be shipped with the game controller so that the user may use the controller immediately after purchase. A second advantage of secondary cell batteries is that the user does not need to frequently purchase new batteries for the game controller and may simply recharge the secondary cell battery provided with the controller. Recharging the secondary cell battery is also a major downside because charging can take a substantial amount of time and, unless the game controller is specially designed, the game controller is unusable during charging. Additionally, recharging the game controller requires the user to perform extra steps, such as pausing a game and plugging in the controller or switching to a new, charged controller.

It is within this context that embodiments of the present invention arise.

BRIEF DESCRIPTION OF THE DRAWINGS

The teachings of the present disclosure can be readily understood by considering the following detailed description in conjunction with the accompanying drawings, in which.

DESCRIPTION OF THE SPECIFIC EMBODIMENTS

Although the following detailed description contains many specific details for the purposes of illustration, anyone of ordinary skill in the art will appreciate that many variations and alterations to the following details are within the scope of the invention. Accordingly, examples of embodiments of the invention described below are set forth without any loss of generality to, and without imposing limitations upon, the claimed invention.

While numerous specific details are set forth in order to provide a thorough understanding of embodiments of the invention, those skilled in the art will understand that other embodiments may be practiced without these specific details. In other instances, well-known methods, procedures, components and circuits have not been described in detail so as not to obscure aspects of the present disclosure. Some portions of the description herein are presented in terms of algorithms and symbolic representations of operations on data bits or binary digital signals within a computer memory. These algorithmic descriptions and representations may be the techniques used by those skilled in the data processing arts to convey the substance of their work to others skilled in the art.

An algorithm, as used herein, is a self-consistent sequence of actions or operations leading to a desired result. These include physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

Unless specifically stated or otherwise as apparent from the following discussion, it is to be appreciated that throughout the description, discussions utilizing terms such as "processing", "computing", "converting", "reconciling", "determining" or "identifying," refer to the actions and processes of a computer platform which is an electronic computing device that includes a processor which manipulates and transforms data represented as physical (e.g., electronic) quantities within the processor's registers and accessible platform memories into other data similarly represented as physical quantities within the computer platform memories, processor registers, or display screen.

A computer program may be stored in a computer readable storage medium, such as, but not limited to, any type of disk including floppy disks, optical disks (e.g., compact disc read only memory (CD-ROMs), digital video discs (DVDs), Blu-Ray Discs™, etc.), and magnetic-optical disks, read-only memories (ROMs), random access memories (RAMs), EPROMs, EEPROMs, magnetic or optical cards, flash memories, or any other type of non-transitory media suitable for storing electronic instructions.

The terms "coupled" and "connected," along with their derivatives, may be used herein to describe structural relationships between components of the apparatus for performing the operations herein. It should be understood that these terms are not intended as synonyms for each other. Rather, in some particular instances, "connected" may indicate that two or more elements are in direct physical or electrical contact with each other. In some other instances, "connected", "connection", and their derivatives are used to indicate a logical relationship, e.g., between node layers in a neural network. "Coupled" may be used to indicated that two or more elements are in either direct or indirect (with other intervening elements between them) physical or electrical contact with each other, and/or that the two or more elements co-operate or communicate with each other (e.g., as in a cause an effect relationship).

Figure 1:
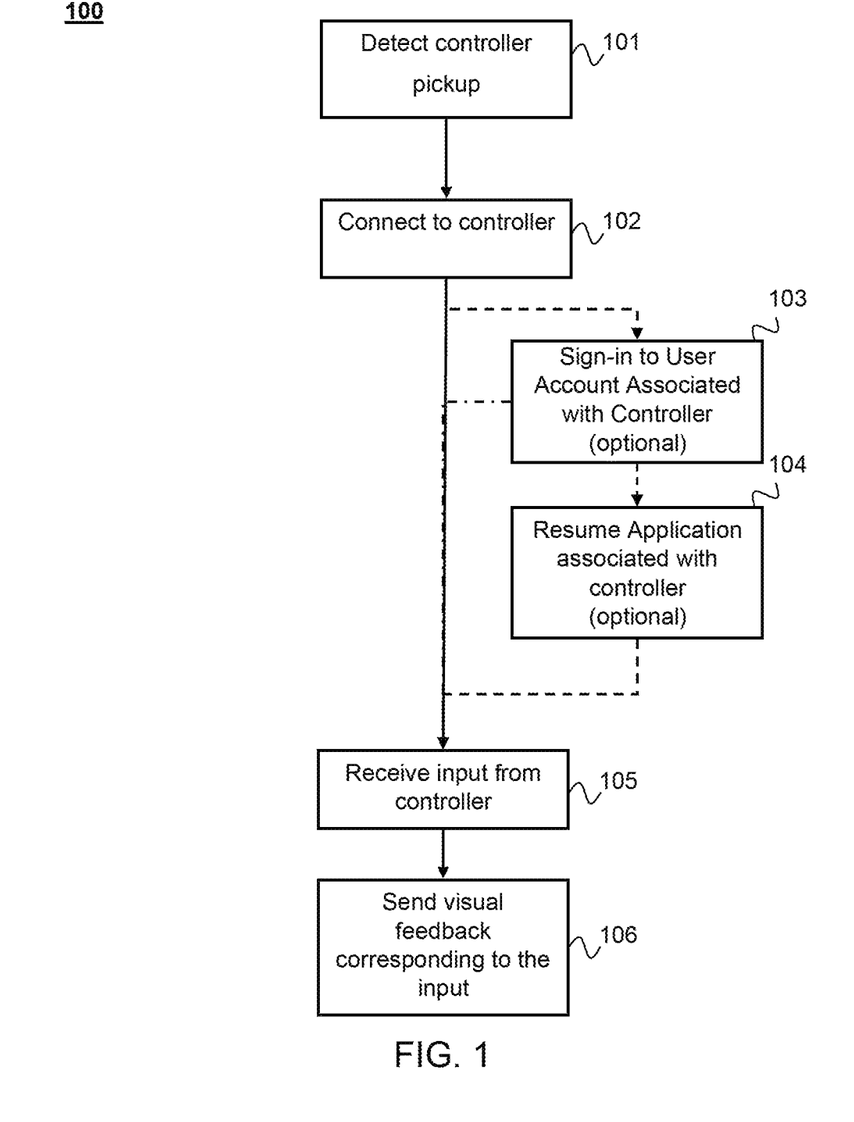
FIG. 1 is a flow diagram depicting a method for controller operation when picked up by a user according to aspects of the present disclosure.

According to aspects of the present disclosure, features of a controller and/or an associated computing device may enhance charging a controller or using a controller after charging. FIG. 1 depicts a method for controller operation 100 according to aspects of the present disclosure. The flow diagram depicted in FIG. 1 illustrates controller operation when a user picks up a controller. As shown, the computing device may detect that the controller has been picked up, as indicate at 101. The computing device may detect that the controller has been picked up when the controller changes state from a charging state to an operation state. Alternatively, the computing device may detect when the user picks up the controller using inertial data from the controller or by analyzing an image obtained with an image capture unit using an image analysis algorithm. Once the computing device detects that the controller has been picked up, the computing device may connect to the controller, as indicated at 102. In some implementations, the computing device may include an internal state from a charging state to an operation state. In some implementations, connecting the computing device to the controller may include other operations, e.g., operations associated with establishing a wireless connection with the controller. After a connection has been established, the controller may begin operating as normally to control the computing device. Specifically, the computing device may receive inputs from the controller 105 and perform computations using those inputs and sending visual feedback corresponding to the input 106 to a display device.

Alternatively, during or after establishing a connection with the controller the computing device may sign-in to a user account or profile associated with the controller 103. During or after establishing connection, the controller may transmit a unique code or other identifier information associated with the controller to the computing device. The computing device may have access to account or profile information associated with the unique code or other identifier information. The computing device may sign-in to the account or profile using the associated account information when the unique code or other identifier information is received from the controller. Non-limiting examples of other identifier information include an assigned controller name, an assigned controller number, a controller color, or other information that may be used to differentiate a first controller from a second controller. After signing into the account or profile associated with the controller, the computing device may return to normal operation, as indicated at 105. According to additional aspects of the present disclosure, the computing device may resume an application associated with the controller after connecting to the controller at 102. Resuming the application may take place after signing-in to an account associated with the controller, as indicated at 103 or may occur upon connection of the computing device to the controller at 102. The computing device may automatically resume an application associated with the controller by automatically creating a log of the unique code or other identifier information and application state information whenever the user pauses an application. When the computing device receives the unique code or other identifier information, the computing device may use the unique code or other identifier information and the log to determine the state information of the application, start the application and load the state information of the application into memory to resume the application at the point where the user paused the application. In situations where the application is still running on the computing device, the application may simply be resumed. After the application resumes, the computing device may return to normal operation 105.

User experience of controller operation is enhanced because the user does not have to pair their controller with the console each time they want to use the controller. It also having to manually sign-in to a user account and resume an application. Additionally, it would be advantageous for the computing device to automatically discern the user's identity when the controller is picked up.

Figure 2:
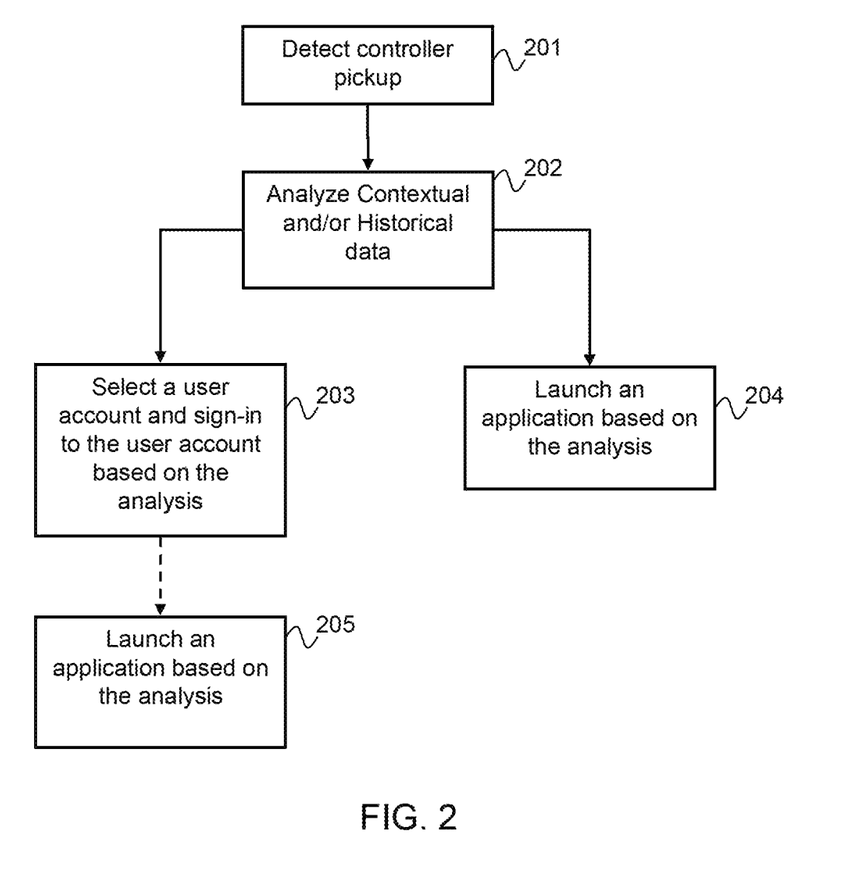
FIG. 2 is a flow diagram depicting a method for controller operation using contextual information according to aspects of the present disclosure.

FIG. 2 is a flow diagram depicting a method 200 for controller operation using contextual information according to aspects of the present disclosure. The method 200 begins when a computing device detects that a controller is picked up, as indicated at 201. As discussed above the computing device may determine that the controller has been picked up when the controller changes states from a charging state to an operational state. Upon detecting this change in state or upon detecting that the controller has been picked up the computing device may change a controller state on the computing device from charging to operation. In other words, the computing may connect to the controller. Before, during or after changing from a controller state on the computing device from a charging state to an operational state, the computing device may perform an analysis of the context surrounding the controller pick up or transition from charging state to operational state, as indicated at 202. The analysis of the context surrounding the controller pick up or transition from charging state to operational state at 202 may use historical data, controller motion data and/or image data from an image capture unit.

Analysis of historical data at 202 may include use of a table or other log file containing past user sign-in times and/or application access times. This computing device may use this table to determine which user account to sign-in at 203 to or which application to resume or start at 204 after the computing device has determined that the controller state has changed from a charging state to an operation state. Alternatively, after signing-in the computing device to a user account or profile the computing may use the historical data to determine an application to resume or start 205.

Figure 3:
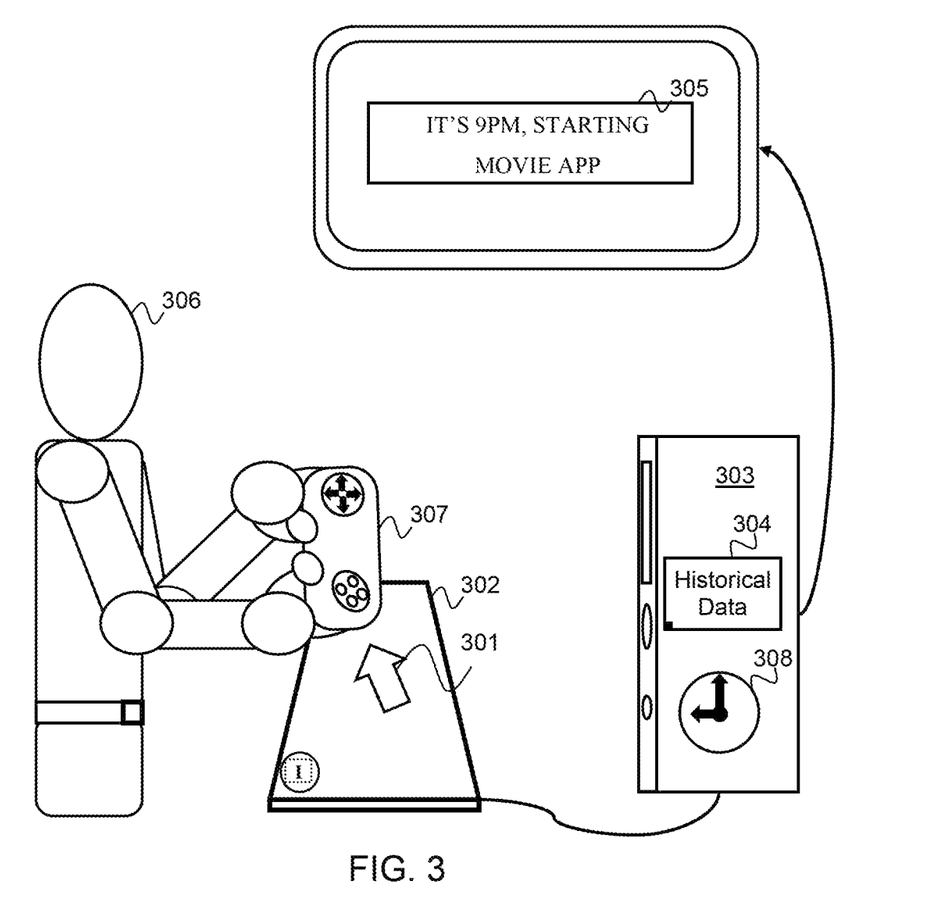
FIG. 3 is a schematic diagram depicting a contextual determination of operation of a controller when picked up by a user according to aspects of the present disclosure.

FIG. 3 graphically depicts an example of contextual determination of an application resume operation with a controller when picked up by a user according to aspects of the present disclosure. As indicated by arrow 301 when a user 306 picks up a controller 307 from a charging pad 302 the controller device changes from a charging state to an operational state. The charging pad 302 may monitor the charging state of the controller 307 and the charging pad may send a signal to the computing device 303 indicating that the controller 307 is no longer charging and has therefore changed from a charging state to an operational state. The computing device 303 may use an internal clock 308 to determine the time that the user 306 picked up the controller 307 from the charging pad 302 and historical data 304 to determine an application historically resumed or started by the user and launch the determined application, as indicated at 305. As shown for example and without limitation the computing device in FIG. 3 may receive a time when the controller changes from the charging state to an operational state from the charging pad, the computing device may use a table or other log files containing historical data 304 to look up applications started by the user at 9:00 PM. From the historical data the computing device determines that for example the user on average starts a movie streaming application on the computing device at 9:00 PM, the computing device may then launch the movie app at 305.

Figure 4:
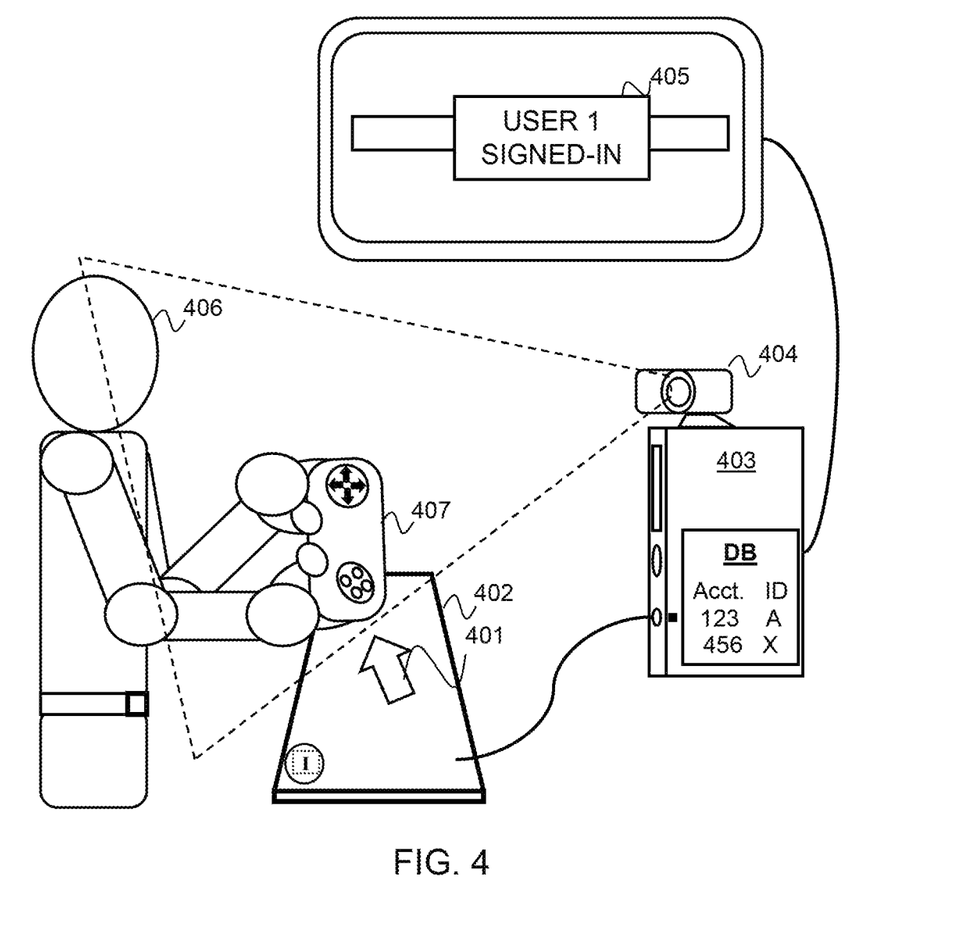
FIG. 4 is a schematic diagram showing a computing device having an image capture unit for use with the methods for controller operation when picked up by a user according to aspects of the present disclosure.

Alternatively, the images from the user or the controller from an image capture unit may be used to determine the context of the user picking up the controller and the controller transitioning from a charging state to an operational state as shown in FIG. 4. FIG. 4 is a diagram showing a computing device having an image capture unit for use with the methods for controller operation when picked up by a user according to aspects of the present disclosure. An image capture unit 404 may take an image such as a picture or video of a user 406 when the user picks up a controller 407 from a charger 402 as indicated by the arrow 401. The image capture unit may be a camera, video camera, laser scanning device or other device that converts visible light or non-visible radiation (e.g., infrared or ultraviolet) into electrical signals that can be interpreted as an image. The charger 402 may send a signal to a computing device 403 that the controller is no longer charging and therefore the controller has changed states from a charging state to an operational state. This signal may trigger the image capture unit 404 to turn on and take an image of the user 406. Alternatively, the image capture unit may always be on and analyzing images to determine when a user picks up the controller. The computing device 403 or a server in communication with the computing device may apply facial recognition algorithms to the image to recognize if a person is holding the controller 407 and the identity of the person holding the controller. The computing device 403 may include a database DB with associations between user-account and identifier information. The identifier information may be any information used to associate an image taken from the image capture unit with a user. Identifier information may be generated during an enrollment processor for the user to sign-in to their account with the computing device 403. During the enrollment process, images may be captured and identified with the user 406. The identifier information generated from the identified images may be stored on the computing device and associated with corresponding user accounts, e.g., in the database DB. The identified images from any subsequent identification of the user 406 may also be stored for improving the identifier information. Once the identity of the user has been determined, the computing device 403 may, for example, sign-in to the account associated with the detected user 406. Additionally, in some embodiments the computing device may resume or launch an application associated with the controller after signing into a user account.

In another alternative implementation, motion data from the controller may be used to determine the user's identity. For example, and without limitation the controller may include an inertial measurement unit (IMU) that include an accelerometer, gyroscope, tilt sensor or other sensor for controller movement. When a user picks up the controller, they may include a signature movement that is identifiable to that user. During enrollment of the user with a user account or profile, the computing device may record signature movement sensed by the IMU as signature movement information of the user, which may then be associated with a user account. Signature movement information may be stored on the computing device and associated with a user account, the signature movement information may include inertial data from the controller when the user picks up the controller. Thus, when a user picks up the controller and the inertial data from the controller matches the signature movement information, the user has been identified and the computing device may sign into the user account associated with the signature movement and the user holding the controller. For example and without limitation a person having tremors may enroll a user account on the computing device and during enrollment signature movement information of the person may be recorded as the person picks up the controller and puts the controller down several times. The signature information is then associated with a user account or profile in memory or an external database. The signature information for the user having tremors may include a combination of many unique acceleration spikes due to the user's condition. Thus, the controller detects the unique combination of spikes the computing device may sign-in to the associated user account.

Figure 5:
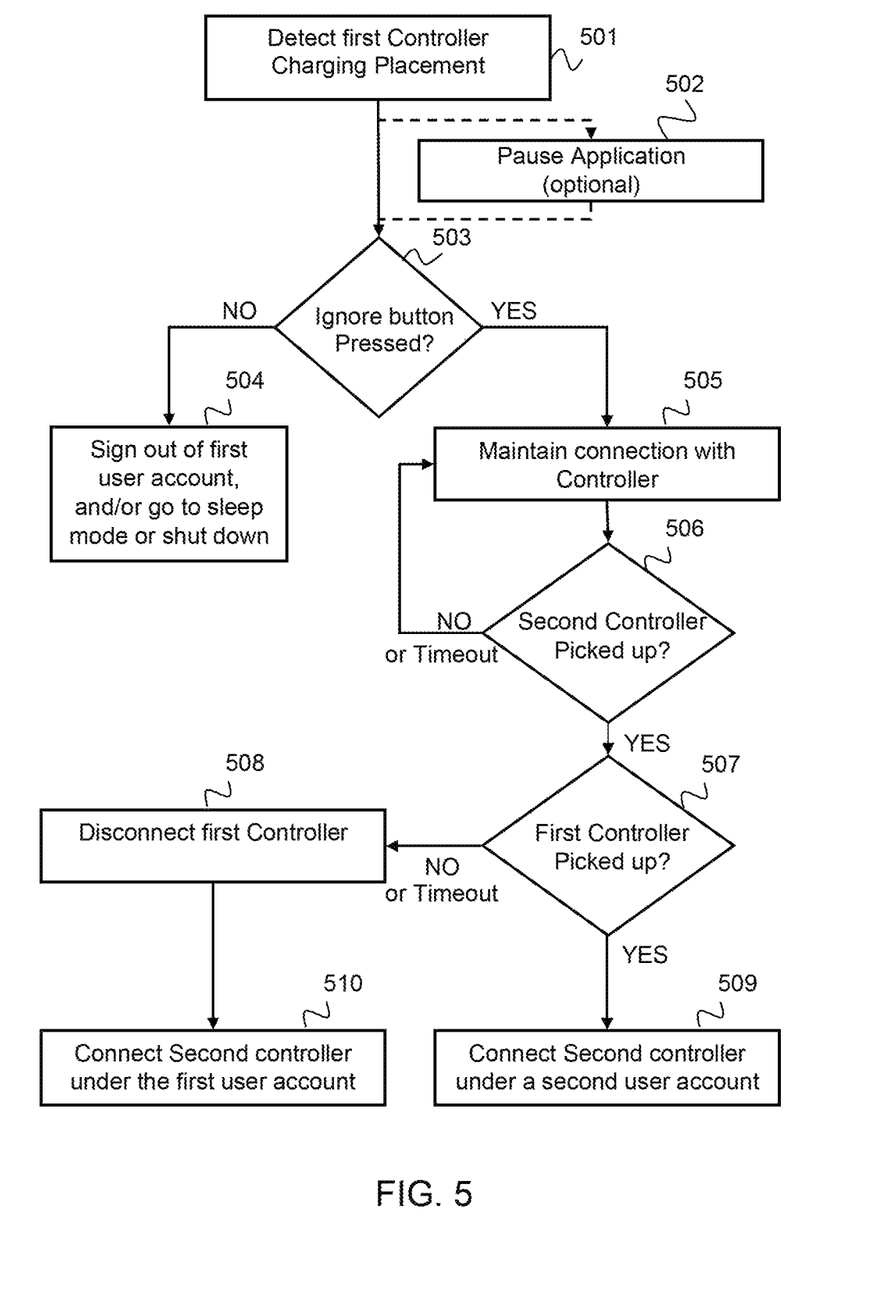
FIG. 5 is a flow diagram showing a method for controller operation when placed in a charging state according to aspects of the present disclosure.

FIG. 5 is a flow diagram showing a method for controller operation when placed in a charging state according to aspects of the present disclosure. The computing device may detect that the user has placed the controller down, as indicated at 501. By way of example, and not by way of limitation, the computing device may detect that the controller has changed state from an operational state to a charging state or that the user or another person is not holding the controller. Detection of the change in state from an operational state to a charging state may use for example and without limitation a signal from a charging pad connected to the computing, a signal from the controller or a signal from the image capture unit.

Upon detection that the user has placed the controller down at 501, the computing device may (optionally) automatically pause an application that is running on the computing device, as indicated at 502. The pause operation may save a state of the application running on the computing device so that the state may be loaded to resume the application if the device shuts down or the application closes or the device gets picked up again. Alternatively, the computing device may simply pause further processing of the application.

The charger, controller or computing device may include an ignore input that when triggered causes the computing device to ignore that the controller has been placed down by the user or has changed state from an operational state to a charging state. After detecting that the user has placed the controller down at 501 or (alternatively) the computing device has paused an application at 502, the computing device may check if an ignore input signal has been received as indicated at 503. The ignore input may be a button, a touchscreen press a switch, series of buttons, a controller movement, a voice command, a visual gesture that can be captured by image capture device or any other type of interface element that the computing interface interprets to be the ignore input. When the ignore input signal is not received after a time out period, the console may sign-out of a user account or profile and/or go into a sleep mode or shut down, as indicated at 504. The sleep mode may be a power conservation mode where most of the features of the computing device are off or in a power saving mode but the state of the device is saved in memory so that the computing device may quickly 'waken' and the state of the device prior to sleeping is quickly restored. The time-out period may be set time the computing device waits to receive an ignore input signal the time out period may be any length for example and without limitation less than 30 seconds, less than a minute, less than 2 minutes, or no time out. When an ignore input signal is received before or during the time period, the computing device may ignore that the controller has been placed down or the controller has changed state from an operational state to charging state and maintain a connection with the controller, as indicated at 505. Additionally, if the controller is put down or changes state from an operation state to a charging state after the ignore input is received and within an input reception time period then the computing device may ignore the change in state of the controller from operation to charging and maintain a connection with the controller at 505. The input reception period may be the same length as the time-out period or may be a different length for example and without limitation less than 30 seconds, less than a minute, less than 2 minutes. If the ignore input is received and the controller is not placed down or does not change from an operational state to a charging state within the input reception time period then a subsequent change in controller state from "operational" to "charging" after the input reception period has elapsed will not cause the device to act as if the ignore input has been pressed. If the controller has been set down or has in a charging state and the ignore input has been received the computing device may maintain a connection with the controller at 505 and wait for further actions from the user. This provides the benefit that a player may temporarily set down their controller on a charging pad without putting the computing device to sleep or signing-out of their profile.

A common situation for controllers with rechargeable batteries occurs when the batteries of a first controller run out of energy. In such situations, a user may turn off the first controller, place it in a charging state, pick up a second controller that is fully charged and use the second controller in place of the first controller. According to some aspects of the present disclosure, an "ignore" button may facilitate such controller switching. The computing device may continually monitor a second controller for a change of state from a charging state to an operational state or for the second controller to be picked up while the first controller is in a charging state or set down, as indicated at 506. In some cases, if a second controller is not picked up after a pick-up period the computing device may simply maintain a connection with the first controller, at 505. If the first controller is not picked up or does not change state from the charging state to the operational state within a shutdown time period, the computing device may disconnect from the controller and sign-out from the user account and/or enter a sleep mode or shutdown. If a second controller is picked up or changes from a charging state to an operational state then the computing device may wait to detect if the first controller is also picked up or changes state from the charging state to the operational state, as indicated at 507.

When the computing device detects that the first controller has been picked up within a controller exchange period, the computing device determines that two players want to play the game. Thus, the computing device connects to the second controller or changes an internal controller state for the second controller from charging to operation under a second user account or profile 509. As such, the first controller is signed in under a first account or profile and the second controller is signed in under a second account or profile allowing two players or to play on the computing device simultaneously. Settings and profile customization may be saved separately for each account associated with each controller. While the described methods involve first and second controllers, these methods may be extended to any number of controllers including a third, fourth or more controllers.

When the first controller is not picked up within the controller exchange period, the first controller may be disconnected from the computing device, as indicated at 508. Disconnection of the controller from the computing device may be accomplished by the computing device changing an internal state fort the controller from an operational state to a charging or non-operational state and subsequently ignoring inputs (except for some basic charging or signals when applicable) from the first controller. The computing device may then connect to the second controller under the first user account or profile at 510 thereby accomplishing controller switching as the user may use the second controller exactly as if it were the first controller.

Figure 6:
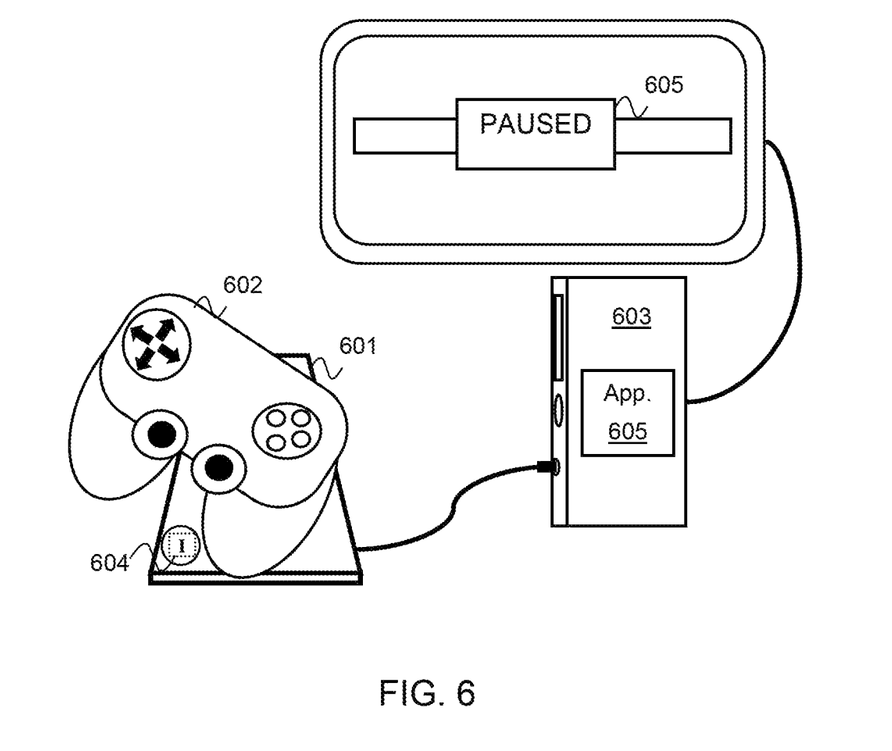
FIG. 6 is a schematic diagram that depicts a controller on a charger with an ignore input according to aspects of the present disclosure.
Figure 7:
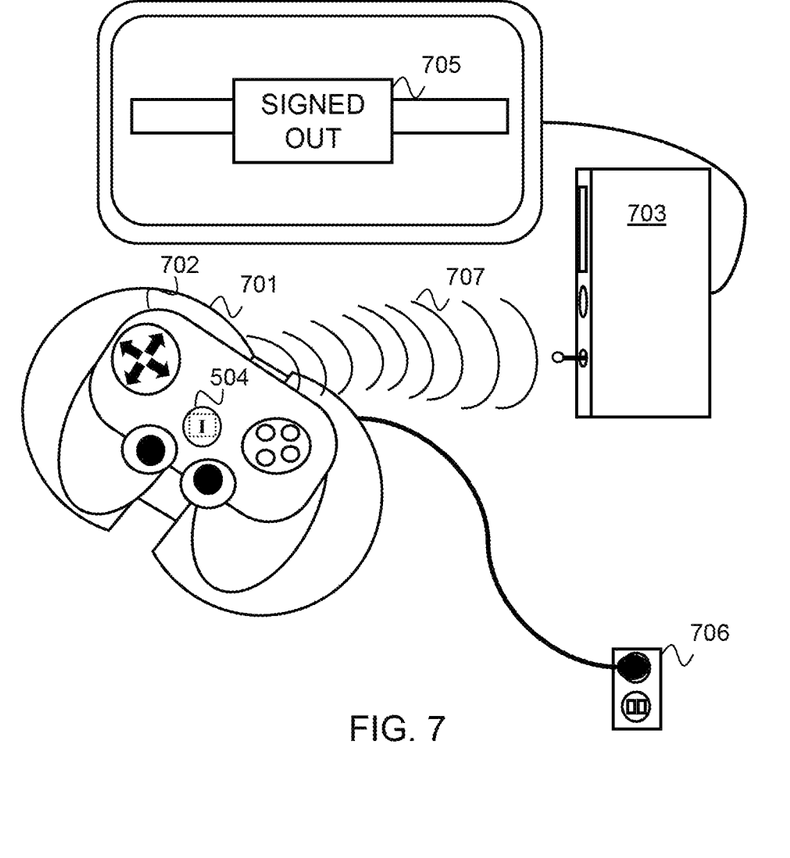
FIG. 7 is a schematic diagram showing a controller having an ignore input on a controller according to aspects of the present disclosure.
Figure 8:
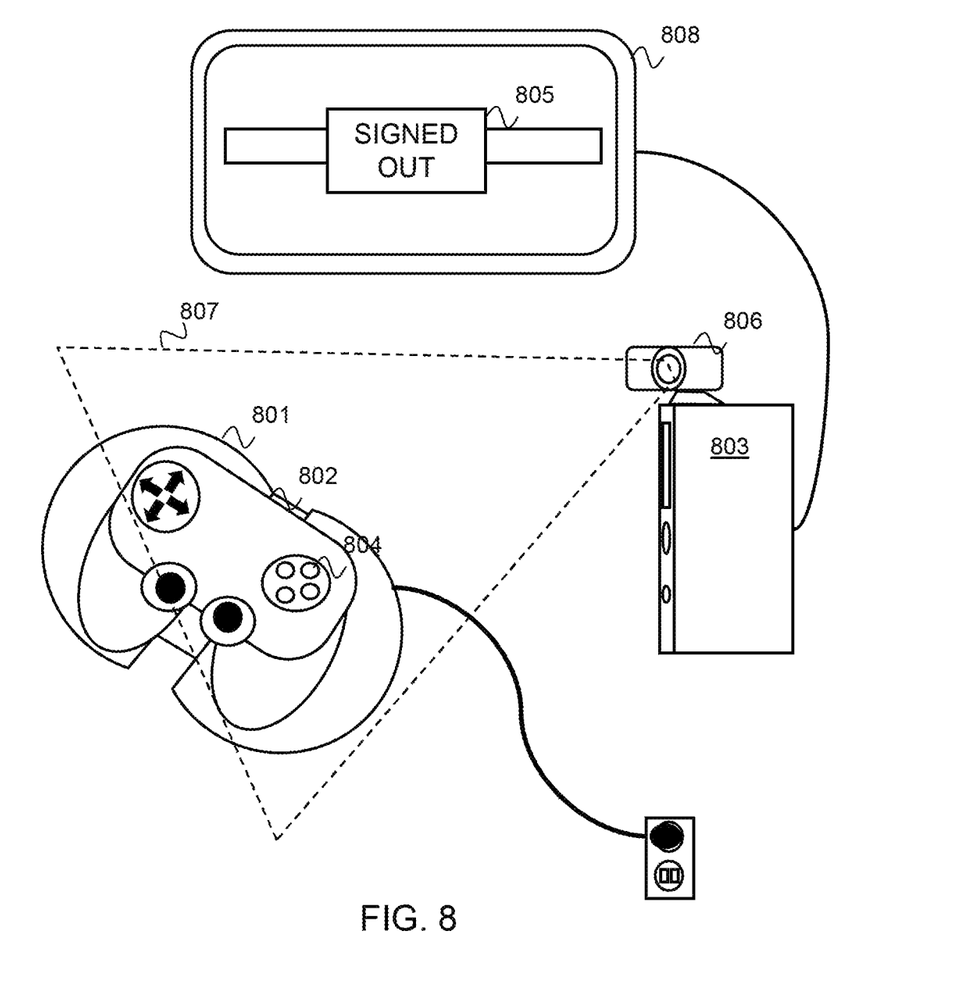
FIG. 8 is a schematic diagram depicting a computing device having an image capture unit for use with the methods for controller operation when placed on a charger according to aspects of the present disclosure.

FIG. 6 through FIG. 8 depict different embodiments of the present disclosure having different locations for the "ignore" input and/or different charging methods. FIG. 6 is a diagram that depicts a controller on a charger with an ignore input according to aspects of the present disclosure. As shown in FIG. 6, a controller 602 may be placed on a charger 601, e.g. a wireless charger or a charging pad that connects to the controller via electrically conductive contacts. The charger 601 is connected to a computing device 603 and includes an "ignore" input 604. In this case the ignore input is an ignore button mounted to the case of the charger 601. When the ignore input 604 is triggered by, for example, pressing the ignore button, the charger 601 may send an ignore signal to the computing device through the connection between the computing device and the charging pad. Here, the ignore button has not been pressed but the controller 602 has been set down on the charger 601 and the controller 602 has changed state from an operational state to charging state. The computing device 603 may receive a signal from the charging pad 601 that indicates to the computing device 603 that that the controller 602 is charging. The user in the example shown has the option to pause the applications on controller set down enabled, as such the computing device pauses an application 605 running on the computing device 603.

FIG. 7 is a diagram showing a controller having an ignore input on a controller according to aspects of the present disclosure. In the example shown, a charger 701 is not in communication with the computing device 703 and is instead simply plugged in to a wall outlet 706. The charger 701 may be a charging pad, charging cable, charging stand, or other similar charging device. The controller 702 is in communication with the computing device 703 via a wireless connection 707. The controller 702 has been connected to the charger 701 the controller sends a wireless signal 707 to the computing device 703 notifying the computing device 703 that the controller 702 has changed state from an operational state to a charging state. When the "ignore" input 704 is triggered the controller may send a wireless signal 707 notifying the computing device 703 that the "ignore" input 704 has been triggered. Here, the ignore input 704 has not been triggered but the controller 702 has been connected to the charger 701. The controller 702 wirelessly communicates 707 with the computing device 703 that it has changed a state from the operational state to the charging state. After the time-out period has elapsed the computing device signs out of a user account, as indicated at 705. The advantage of this embodiment is that a specialized charging pad that communicates with the computing device does not need to be developed. The wireless signal may be, wireless internet, Bluetooth, near-field communication, infrared, etc.

FIG. 8 is a diagram depicting a computing device having an image capture unit for use with the methods for controller operation when placed on a charger according to aspects of the present disclosure. Use of an image capture unit 806 communicatively coupled to the computing device 803 allows even greater flexibility and options for controller operation. In the example depicted in FIG. 8, the user has placed the controller 802 down upon a charger 801. The image capture unit 806 may be configured to take images of an area 807 in front of a display device 808 that includes the charger 801. The image capture unit 806 may take an image that the computing device recognizes as an indication that the user is not holding the controller or the controller has changed state from an operational state to a charging state. By way of example, and not by way of limitation, the captured image may show user setting the controller down or that the controller is not in the user's hands, or that the controller is on the charger. The computing device may use machine-learning algorithms with the images to aid in identification of whether the controller is being held by the user or has changed state from an operational state. Machine learning algorithms may include object detection algorithms, object recognition algorithms, facial recognition algorithms or the like. According to some aspects of the present disclosure, the image capture unit 806 may be used to determine whether the computing device 803 should sign out of user a profile. For example and without limitation computing device 803 may analyze images from the image capture unit 806 that include a user and a controller but the controller is not in the user's hands or is on the charger, in these cases the computing device 803 may interpret this as an ignore input and maintain a connection with the controller. Alternatively, the ignore input may be a series of button presses on the controller 802. In some embodiments of the present disclosure there may not be a specialized ignore input button. Instead, a reprogrammable button, a series of button presses, or multiple simultaneous button presses may be used as an ignore input where the buttons have other functions when pressed individually or programmed differently. In the example shown, the controller 802 is on the charger 801 and the computing device 803 analyzes the image captured 807 by the image capture unit 806 and determines that there is no user nearby. Thus, no ignore input has been received and the computing device determined that the controller state has changed from an operational state to a charging state. The computing device 803 therefore signs out of a user account, as indicated at 805, in accordance with the method described in FIG. 5. With the use of an image capture unit, the presently described methods for controller operation may be used without a specialized hardware for the controller or charger.

System

Figure 9:
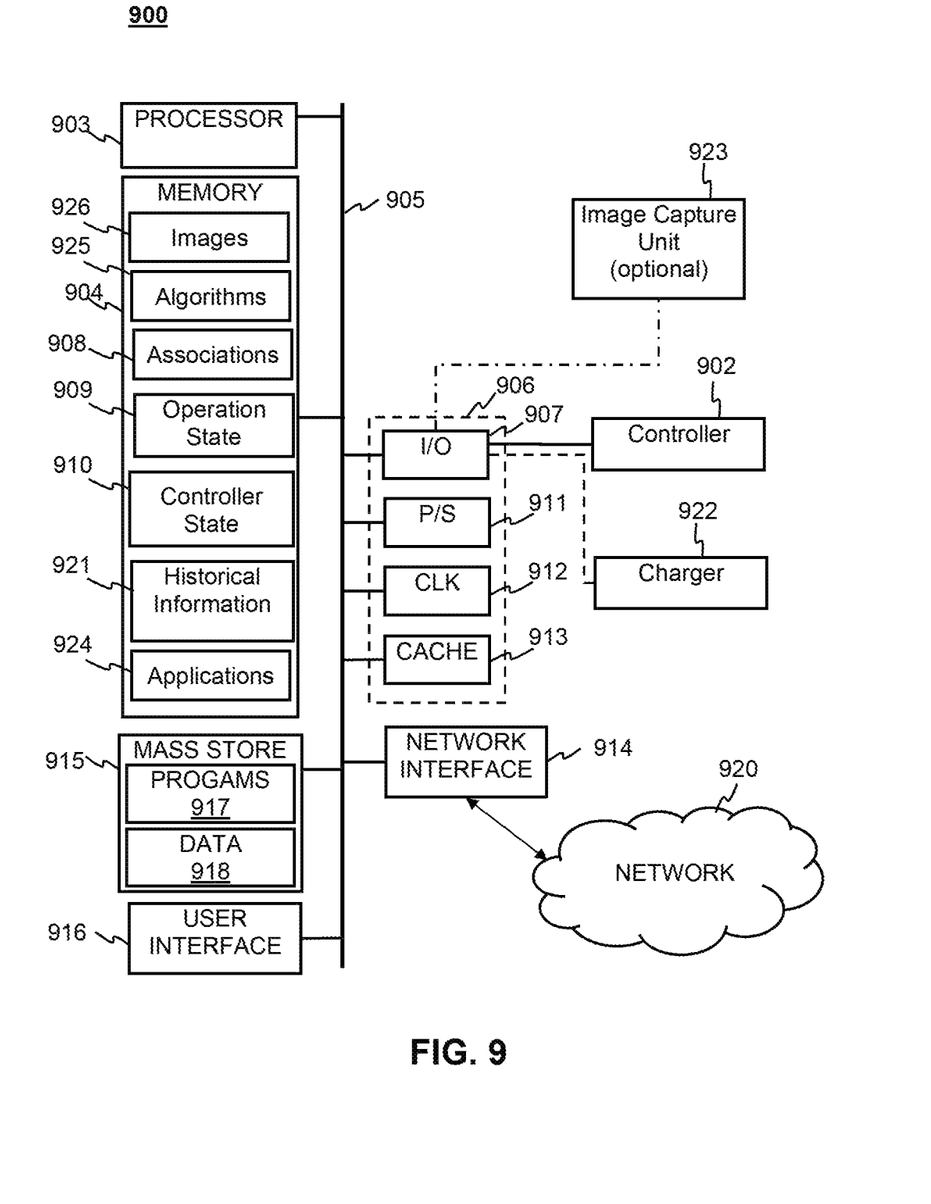
FIG. 9 is a block diagram depicting a system for controller operation and charging according to aspects of the present disclosure.

FIG. 9 depicts a system 900 for controller operation and charging according to aspects of the present disclosure. The system 900 may include one or more processor units 903, which may be configured according to well-known processor architectures, such as, e.g., single-core, dual-core, quad-core, multi-core, processor-coprocessor, cell processor, and the like. The marketplace server may also include one or more memory units 904 (e.g., random access memory (RAM), dynamic random-access memory (DRAM), read-only memory (ROM), and the like).

The processor unit 903 may execute one or more programs 917, portions of which may be stored in the memory 904 and the processor 903 may be operatively coupled to the memory, e.g., by accessing the memory via a data bus 905. The programs 917 may be configured to determine the operation state 909 of the system in response to a change in controller state 910 detected from a controller 902 according to the method described above with respect to FIG. 1 and/or FIGS. 2 and/or FIG. 5. The operation state 909 may determine whether the system is signed-in to a user account or profile or the system is in a sleep mode or shutting down. The operation state may also include state information for the system and applications running on the system. The state information may be loaded with the application 924 to resume the applications and/or the system. The memory 904 may store associations between user accounts and user identifiable information or controller identification information 908. Additionally, the memory 904 may store historical information 921 that may be analyzed to determine the system's behavior with respect to applications 921 or an operation state 909 of the system 900. The historical information 921 may include application use information, user account information, times of use information, image information etc. The memory 904 may store images 926 captured by the image capture unit 923 and algorithms 926 to analyze the images and determine a whether a user is holding the controller 902 or the controller 902 has changed state from an operational state to a charging state. The algorithms 925 may be machine learning algorithms such as object recognition algorithms, facial recognition algorithms etc. The Applications, Historical information, Algorithms, Associations, Operation state and controller state may also be stored as data 918 in the Mass Store 918.

The system 900 may also include well-known support circuits, such as input/output (I/O) 907, circuits, power supplies (P/S) 911, a clock (CLK) 912, and cache 913, which may communicate with other components of the system, e.g., via the bus 905. The computing device may include a network interface 914. The processor unit 903 and network interface 914 may be configured to implement a local area network (LAN) or personal area network (PAN), via a suitable network protocol, e.g., Bluetooth, for a PAN. The computing device may optionally include a mass storage device 915 such as a disk drive, CD-ROM drive, tape drive, flash memory, or the like, and the mass storage device may store programs and/or data. The system may also include a user interface 916 to facilitate interaction between the system and a user. The user interface may include a display device such as monitor, Television screen, speakers, headphones or other devices that communicate information to the user. The display device may include visual, audio, or haptic display or some combination thereof. A controller 902 such as a mouse, keyboard, game controller, joystick, etc. may communicate with an I/O interface and provide control of the system to a user. Additionally, a charger 922 may optionally communicate with the system with the I/O interface 906. The Charger may be a charging pad, charging cable, charging cradle or other device that provides power to the controller 902 to charge a battery in the controller 902. An image capture unit such as a camera, video camera or other light transducing device may optionally be communication with the system with the I/O interface 906.

Controller operation in accordance with aspects of the present disclosure can reduce or even eliminate additional time and effort associated with connecting or disconnecting a controller every time a player wants to use the controller. Although many of the implementations discussed above have application to video games, there is potential use in other applications. For example, a television could run certain list of tasks depending on the input from a charger for a remote controller. Similarly, a multimedia player or TV set-top box can run certain list of tasks depending on the input from charger for remote controller. Those skilled in the art will be able to device other implementations within the scope of the present disclosure.

While the above is a complete description of the preferred embodiment of the present invention, it is possible to use various alternatives, modifications and equivalents. It is to be understood that the above description is intended to be illustrative, and not restrictive. For example, while the flow diagrams in the figures show a particular order of operations performed by certain embodiments of the invention, it should be understood that such order is not required (e.g., alternative embodiments may perform the operations in a different order, combine certain operations, overlap certain operations, etc.). Furthermore, many other embodiments will be apparent to those of skill in the art upon reading and understanding the above description. Although the present invention has been described with reference to specific exemplary embodiments, it will be recognized that the invention is not limited to the embodiments described but can be practiced with modification and alteration within the spirit and scope of the appended claims. The scope of the invention should therefore be determined with reference to the appended claims, along with the full scope of equivalents to which such claims are entitled. Any feature described herein, whether preferred or not, may be combined with any other feature described herein, whether preferred or not. In the claims that follow, the indefinite article "A", or "An" refers to a quantity of one or more of the item following the article, except where expressly stated otherwise. The appended claims are not to be interpreted as including means-plus-function limitations, unless such a limitation is explicitly recited in a given claim the phrase "means for."

What is claimed is:

1. In a computing device configured to operate with a controller, a method for controller operation, comprising:
   detecting a change in a state of the controller from a charging state to an operation state with the computing device;
   changing a state of the computing device from a controller charging state to a controller operation state in response to detecting the change in the state of the controller;
   receiving an input from the controller with the computing device;
   sending a visual indication of the input to a display device;
   automatically signing the computing device into a user account associated with the controller, or launching an application, or resuming the application, after detecting the change in the state of the controller.

2. The method of claim 1 further comprising analyzing historical or contextual data with the computing device to determine a user account or an application associated with the controller.

3. The method of claim 2 further comprising automatically signing the computing device into to a user account or launching an application associated with the controller after detecting the change in the state of the controller.

4. The method of claim 2 wherein analyzing contextual data includes using images captured from an image capture unit to determine a user account or application associated with the controller.

5. The method of claim 2 wherein analyzing contextual data includes using a time of the detected change in controller state to determine the user account or application associated with the controller.

6. The method of claim 2 wherein analyzing historical data includes analyzing past application launch information or past account sign-in information.

7. The method of claim 2 wherein analyzing contextual information includes using controller motion information.

8. The method of claim 1 wherein detecting the change in the state of the controller includes using charging state information to determine the change in the state of the controller to the operation state.

9. The method of claim 1 wherein detecting a change in the state of the controller state includes using controller motion information.

10. The method of claim 1 wherein detecting the change in the state of the controller includes using image information from an image capture unit.

11. A system for enhanced controller operation comprising;
    a processor;
    a controller coupled to the processor;
    a memory coupled to the processor;
    non-transitory instructions embedded in memory controller operation comprising:
       detecting a change in a state of the controller from a charging state to an operation state with the processor;
       changing a state of the processor from a controller charging state to a controller operation state in response to detecting the change in the state of the controller;
       receiving an input from the controller with the processor;
       sending a visual indication of the input to a display device;
       automatically signing the computing device into a user account associated with the controller, or launching an application, or resuming the application, after detecting the change in the state of the controller.

12. Non-transitory instructions embedded in a computer readable medium that when executed by a computer cause the computer to carry out the method for enhanced charging comprising:
    detecting a change in a state of a controller from a charging state to an operation state with the computer;
    changing a state of the computer from a controller charging state to a controller operation state in response to detecting the change in the state of the controller;
    receiving an input from the controller with the computer;
    sending a visual indication of the input to a display device;

automatically signing the computing device into a user account associated with the controller, or launching an application, or resuming the application, after detecting the change in the state of the controller.

\* \* \* \* \*